M. ALBRO.
SCRAPER ATTACHMENT FOR PITCHFORKS.
APPLICATION FILED MAR. 26, 1917.
1,234,110.  Patented July 24, 1917.
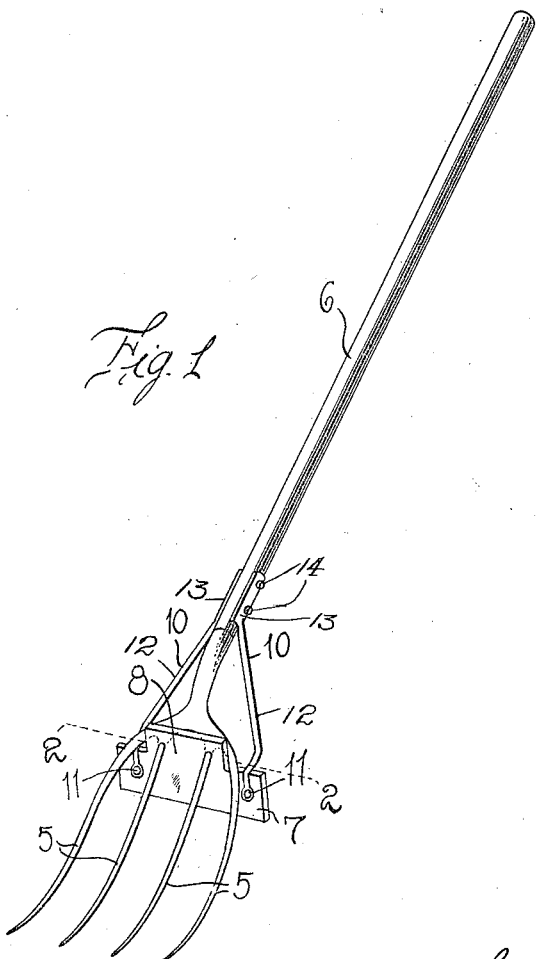
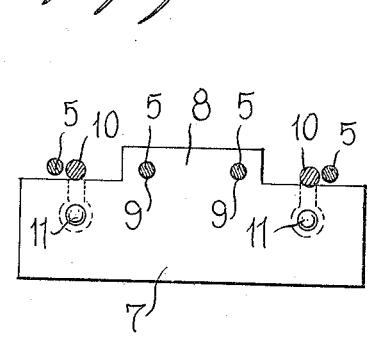
Inventor
MARK ALBRO
By Watson E. Coleman
Attorney

UNITED STATES PATENT OFFICE.

MARK ALBRO, OF BRAMPTON, NORTH DAKOTA.

SCRAPER ATTACHMENT FOR PITCHFORKS.

1,234,110.   Specification of Letters Patent.   Patented July 24, 1917.

Application filed March 26, 1917. Serial No. 157,522.

*To all whom it may concern:*

Be it known that I, MARK ALBRO, a citizen of the United States, residing at Brampton, in the county of Sargent and State of North Dakota, have invented certain new and useful Improvements in Scraper Attachments for Pitchforks, of which the following is a specification, reference being had to the accompanying drawings.

This invention relates to an improved scraper attachment for pitch forks and has for its primary object to provide a device which may be easily and quickly attached to the ordinary pitch fork and which may be conveniently employed for scraping or cleaning out the floors of cattle stalls.

It is a more particular object of the invention to provide a scraper attachment of the above character consisting of a scraper plate having means whereby said plate may be engaged upon the spaced, intermediate tines of the fork, and brace rods rigidly connecting the plate adjacent its opposite ends to the fork handle.

It is another object of the invention to provide a scraper of simple and durable construction, which is so arranged upon or attached to the fork that the attachment will not in any way interfere with the ordinary use of the pitch fork.

With the above and other objects in view, my invention consists in the novel features of construction, combination, and arrangement of parts to be hereinafter more fully described, claimed, and illustrated in the accompanying drawing, in which, Figure 1 is a perspective view showing the preferred embodiment of my improved scraper attachment applied to the fork; and Fig. 2 is a sectional view taken on the line 2—2 of Fig. 1.

Referring in detail to the drawing, 5 designates the fork tines which are suitably connected or fixed to the end of a suitable handle 6. In the accompanying illustration, I have illustrated a fork having four tines, though it is to be understood that my invention is applicable to other fork constructions having various numbers of tines.

In the accompanying drawing, wherein I have illustrated an embodiment of my invention which I have found highly satisfactory in use, 7 designates the scraper plate which is of elongated, rectangular form, said scraper being of a length substantially equivalent to the maximum width of the fork. This plate is provided upon one of its longitudinal edges and centrally thereof with an outwardly projecting, rectangular lug 8 in which spaced openings 9 are formed. These openings are adapted to receive the central spaced tines 5 of the fork.

A brace rod 10 has one of its ends bent down over the edge of the plate 7, upon which the lug 8 is formed and engaged upon the front face of the scraper plate. These bent ends of the brace rods 10 are flattened and securely riveted, as indicated at 11, to the scraper plate. The end portions of the scraper plate extend transversely beneath the outermost tines. These brace rods are obliquely extended in convergent relation as shown at 12, and their inner ends are longitudinally extended upon opposite sides of the fork handle 6, as shown at 13, and securely riveted to said handle at spaced points, as indicated at 14. Thus, it will be apparent that the scraper blade is securely braced and held against angular twisting movement with respect to the fork tines.

In the use of my device, it will be understood that as the scraper plate 7 is located at the inner ends of the tines 5, the pitch fork may be used in the usual manner for pitching straw or hay, and when it is desired to use the scraper for scraping the floors of cattle stalls, the lower edge of the scraper blade is disposed at such distance from the tines 5 by simply changing the angle of the fork handle. This scraper edge may be engaged with and moved over the floor surface without liability of the points of the tines penetrating the floor and being bent, twisted, or broken. The scraper blade may, of course, be made of any width desired. The device as a whole is of relatively simple construction, and its application to the fork requires no changes in the construction of the latter. The device is also highly serviceable and convenient in practical use and may obviously be manufactured at relatively small cost.

While I have herein shown and described the preferred construction and arrangement of the several elements, the device is, nevertheless, susceptible of considerable modification therein and I, therefore, reserve the privilege of adopting all such legitimate changes as may be fairly embodied within the spirit and scope of the invention as claimed.

Having thus fully described my invention, what I desire to claim and secure by Letters Patent is:

1. The combination with a pitch fork, of a scraper plate having spaced openings adjacent one edge to receive the central tines of the fork, the ends of the plate extending transversely beneath the remaining fork tines, and brace rods fixed at one of their ends to the opposite ends of said plate and secured at their other ends to the opposite sides of the fork handle.

2. The combination with a pitch fork, of a scraper plate having a lug centrally projecting from one of its edges and longitudinal edges and provided with spaced openings to receive the intermediate spaced tines of the fork, the ends of the plate extending transversely beneath the remaining fork tines, brace rods secured to the said edge of the scraper plate adjacent its opposite ends and having convergently disposed portions extending inwardly toward the fork handle, the inner ends of said rods extending longitudinally along opposite sides of the handle, and means permanently securing said extremities of the rods to the handle.

In testimony whereof I hereunto affix my signature in the presence of two witnesses.

MARK ALBRO.

Witnesses:
A. B. CARLSON,
F. E. PRENTICE.

Copies of this patent may be obtained for five cents each, by addressing the "Commissioner of Patents, Washington, D. C."